United States Patent
Andreae et al.

(10) Patent No.: US 7,650,218 B2
(45) Date of Patent: Jan. 19, 2010

(54) APPARATUS, SYSTEM, AND METHOD FOR PREVENTING TURBOCHARGER OVERSPEED IN A COMBUSTION ENGINE

(75) Inventors: Morgan Andreae, Columbus, IN (US); Adrian Dale, Columbus, IN (US); Jeffrey A. Matthews, Columbus, IN (US); William A. Rankin, Columbus, IN (US); Vivek A. Sujan, Columbus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 217 days.

(21) Appl. No.: 11/858,728

(22) Filed: Sep. 20, 2007

(65) Prior Publication Data

US 2009/0082936 A1    Mar. 26, 2009

(51) Int. Cl.
*G06F 19/00* (2006.01)
*F02B 33/44* (2006.01)

(52) U.S. Cl. .................. 701/101; 701/100; 60/605.1; 60/611

(58) Field of Classification Search ......... 701/100–103, 701/114; 60/597, 600–603, 605.1, 611, 612; 123/559.1, 564; 73/114.69; 702/142, 145, 702/193
See application file for complete search history.

(56) References Cited

U.S. PATENT DOCUMENTS

| | | | |
|---|---|---|---|
| 3,906,729 A | 9/1975 | Conner et al. | |
| 4,483,147 A | 11/1984 | Evans et al. | 61/611 |
| 5,437,539 A | 8/1995 | Gysling et al. | 415/68 |
| 5,508,943 A | 4/1996 | Batson et al. | 364/551.01 |
| 6,055,812 A * | 5/2000 | Trumbower | 60/612 |
| 6,092,029 A | 7/2000 | Bently | 702/56 |
| 6,256,992 B1 * | 7/2001 | Lewis et al. | 60/603 |
| 6,317,655 B1 | 11/2001 | Khots et al. | 700/275 |
| 6,364,602 B1 | 4/2002 | Andrew et al. | 415/1 |
| 6,378,306 B2 * | 4/2002 | Koelle et al. | 60/605.1 |
| 6,438,484 B1 | 8/2002 | Andrew et al. | 701/100 |
| 6,536,284 B2 | 3/2003 | Bonanni | 73/660 |

(Continued)

FOREIGN PATENT DOCUMENTS

GB    2083135    3/1982

(Continued)

OTHER PUBLICATIONS

PCT/US2008/077256 International Search Report and Written Opinion, Dec. 8, 2009.

*Primary Examiner*—Willis R Wolfe, Jr.
(74) *Attorney, Agent, or Firm*—Kunzler & McKenzie

(57) ABSTRACT

An apparatus, system, and method are disclosed for preventing turbocharger overspeed in a combustion engine. The method includes determining a turbocharger error term as a difference between a nominal turbocharger maximum speed and a current turbocharger speed. The method further includes determining a turbocharger speed derivative with respect to time. The method includes calculating a turbocharger control response based on the turbocharger error term and the turbocharger speed derivative with respect to time. The turbocharger control response may be a modified turbocharger maximum speed calculated by determining a reference speed multiplier based on the turbocharger error term and the turbocharger speed derivative with respect to time, and multiplying the reference speed multiplier by the nominal turbocharger maximum speed. The method thereby smoothly anticipates turbocharger transient events, and prevents an overspeed condition of the turbocharger.

25 Claims, 8 Drawing Sheets

U.S. PATENT DOCUMENTS

| | | |
|---|---|---|
| 6,785,604 B2 | 8/2004 | Jacobson .................... 701/114 |
| 6,945,047 B2 | 9/2005 | Shea et al. .................... 60/602 |
| 7,007,472 B2 * | 3/2006 | Baize et al. .................... 60/602 |
| 7,069,171 B2 * | 6/2006 | Wang et al. ................. 702/145 |
| 7,089,738 B1 | 8/2006 | Boewe et al. .............. 60/605.2 |
| 7,100,375 B2 * | 9/2006 | Baize et al. .................... 60/602 |
| 7,127,892 B2 * | 10/2006 | Akins et al. .................... 60/600 |
| 2003/0145591 A1 | 8/2003 | Arnold |
| 2004/0016232 A1 * | 1/2004 | Warner et al. ................. 60/602 |
| 2008/0271452 A1 * | 11/2008 | Reynolds et al. ............. 60/611 |
| 2009/0031723 A1 * | 2/2009 | Gehrke et al. ................. 60/603 |

FOREIGN PATENT DOCUMENTS

WO    WO 2006/022635    3/2006

* cited by examiner

APPARATUS, SYSTEM, AND METHOD FOR PREVENTING TURBOCHARGER OVERSPEED IN A COMBUSTION ENGINE

BACKGROUND OF THE INVENTION

1. Field of the Invention

This invention relates to turbocharger control and more particularly relates to preventing overspeed of a turbocharger.

2. Description of the Related Art

Turbochargers have been a common feature on combustion engines to enhance performance. Continuing demand for power density and torque combined with emissions regulations have required continuous innovation in turbocharger hardware and control systems. Hardware related to turbocharger control like wastegates, bypass valves, variable geometry, and adjustable vanes have been known in the art for some time. While improvements in turbocharger hardware are ongoing, turbocharger control systems are largely challenged by limits imposed by present computer processor speeds and turbocharger speed sensor detection speeds, which contribute to a lack of control precision during transient events in real time applications.

Present turbocharger control systems are primarily reactive systems that track only one or two system parameters to determine turbocharger speeds. Reactive turbocharger control systems using limited system parameter input may fail to predict turbo speed transient events. Therefore, present turbocharger control systems must choose between aggressively responding turbocharger control that experiences overshoot of target speeds in highly transient events, or less responsive turbocharger control that may not experience overshoot, but that experiences reduced transient performance. A turbocharger experiencing overspeed can fail immediately, or experience excessive wear on turbocharger parts resulting in reduced service life and reliability.

Some present turbocharger systems include more than one turbocharger stage. These systems allow greater charge densities and compression of intake air. Further, they allow the inclusion of a smaller, high pressure turbocharger to improve turbocharger response, and the inclusion of a larger, low pressure turbocharger to improve turbocharger flow capacity. However, small turbochargers are even more susceptible to overspeed conditions in transient events due to the low mass of the turbine wheel.

SUMMARY OF THE INVENTION

From the foregoing discussion, Applicant asserts that a need exists for an apparatus, system, and method that predictively responds to turbocharger overspeed events. Beneficially, such an apparatus, system, and method would allow aggressive tuning of a turbocharger for enhanced response, but prevent turbo overspeed events in transient operation with currently available sensor detection and computing hardware.

The present invention has been developed in response to the present state of the art, and in particular, in response to the problems and needs in the art that have not yet been fully solved by currently available turbocharger speed control systems. Accordingly, the present invention has been developed to provide an apparatus, system, and method for preventing turbocharger overspeed that overcome many or all of the above-discussed shortcomings in the art.

A system is disclosed for preventing an overspeed of a turbocharger. The system includes an internal combustion engine producing an exhaust stream, a first turbocharger receiving the exhaust stream, and a bypass valve that routes at least a portion of the exhaust stream around the first turbocharger when the bypass valve is open. The system further includes a controller comprising a plurality of modules configured to functionally execute preventing an overspeed of the first turbocharger. The controller includes an operating conditions module, a response module, and an implementation module. In one embodiment, the controller further includes an engine control module. In one embodiment, the first turbocharger is a high pressure turbocharger, and the system includes a second turbocharger that is a low pressure turbocharger.

An apparatus is disclosed for preventing an overspeed of a turbocharger. The apparatus includes a plurality of modules configured to functionally execute the steps of preventing an overspeed of a turbocharger. The apparatus includes an operating conditions module, a response module, and an implementation module. In one embodiment, the apparatus further includes an engine control module. The operating conditions module determines a turbocharger speed error term ($\epsilon_{TS}$) and a turbocharger speed derivative with respect to time ($\delta_{TS}/\delta_t$). The $\epsilon_{TS}$ comprises a difference between a nominal turbocharger maximum speed and a current turbocharger speed. The response module calculates a turbocharger control response based on the $\epsilon_{TS}$ and the $\delta_{TS}/\delta_t$. The implementation module controls the turbocharger based on the turbocharger control response. The engine control module has an air flow target parameter and a turbocharger speed target parameter, and the implementation module may control the turbocharger by adjusting at least one of the air flow target parameter and the turbocharger speed target parameter.

In one embodiment, the turbocharger control response is a modified turbocharger maximum speed, and the response module calculates the modified turbocharger maximum speed by calculating a reference speed multiplier and multiplying the nominal turbocharger maximum speed by the reference speed multiplier. The response module may calculate the reference speed multiplier by applying a sigmoidal function to each of the $\epsilon_{TS}$ and the $\delta_{TS}/\delta_t$. In one embodiment, the response module applies the sigmoidal function:

$$FS_1(\varepsilon_{TS}) = \frac{a_1}{(1 + e^{b_1*(y-c_1)})} + d_1$$

to the $\epsilon_{TS}$ and the sigmoidal function:

$$FS_2\left(\frac{\partial_{TS}}{\partial t}\right) = \frac{a_2}{(1 + e^{b_2*(y-c_2)})} + d_2$$

to the $\delta_{TS}/\delta_t$. In one embodiment, the response module calculates the reference speed multiplier (RS) according to the following equation:

$$RS = \min[(FS_1(\epsilon_{TS})*FS_2(\delta_{TS}/\delta_t)), 1]$$

In one embodiment, the coefficients a through c corresponding to the functions $FS_1$ and $FS_2$ have values in the following ranges: $a_1$=0.01-0.25, $b_1$=0.01-0.5, $c_1$=5-60, $a_2$=(-0.01)-(-0.25), $b_2$=0.01-0.5, $c_2$=3-30.

In one embodiment, the implementation module controls the turbocharger by at least one method as follows: adjusting a turbine bypass valve, adjusting an exhaust gas recirculation valve, adjusting a turbocharger wastegate valve, adjusting a compressor bypass valve, adjusting an exhaust throttle, and/or an adjusting an intake air throttle. In one embodiment, the implementation module controls the turbocharger by adjusting the geometry of a variable geometry turbocharger.

A method is disclosed for preventing an overspeed of a turbocharger. The method includes determining a turbocharger speed error term ($\epsilon_{TS}$), determining a turbocharger speed derivative with respect to time ($\delta_{TS}/\delta_t$), and calculating a turbocharger control response based on the $\epsilon_{TS}$ and the $\delta_{TS}/\delta_t$. The method further includes controlling the turbocharger based on the turbocharger control response.

In one embodiment, the $\epsilon_{TS}$ comprises a difference between a nominal turbocharger maximum speed and a current turbocharger speed. The turbocharger control response may include a modified turbocharger maximum speed, and the method may include controlling the turbocharger based on the turbocharger control response by replacing the nominal turbocharger maximum speed with the modified turbocharger maximum speed. In one embodiment, the turbocharger control response includes a modified turbocharger reference speed gain, and the method may include controlling the turbocharger based on the turbocharger control response by replacing a nominal turbocharger reference speed gain with the modified turbocharger reference speed gain.

In one embodiment, calculating the turbocharger control response based on the $\epsilon_{TS}$ and the $\delta_{TS}/\delta_t$ includes applying at least one sigmoidal function to the $\epsilon_{TS}$ and the $\delta_{TS}/\delta_t$. Applying the at least one sigmoidal function may return a reference speed multiplier, and the method may include setting the modified turbocharger maximum speed to the nominal turbocharger maximum speed multiplied by the reference speed multiplier. In one embodiment, each sigmoidal function (FS) is of the form:

$$FS_n(y) = \frac{a_n}{(1 + e^{b_n*(y-c_n)})} + d_n$$

Where y is one of $\epsilon_{TS}$ and $\delta_{TS}/\delta_t$, where n is an integer identifying the FS, and where $a_n$, $b_n$, $c_n$, and $d_n$ comprise coefficients corresponding to $FS_n$. In one embodiment, n comprises each value from 1 to 2 inclusive, and the reference speed multiplier (RS) comprises: RS=min [($FS_1(\epsilon_{TS})*FS_2(\delta_{TS}/\delta_t)$), 1]. In one embodiment, the coefficients a through d corresponding to functions $FS_1$ and $FS_2$ have about the following values: $a_1$=0.1, $b_1$=0.15, $c_1$=30, $d_1$=1, $a_2$=-0.1, $b_2$=0.25, $c_2$=15, and $d_2$=1. In one embodiment, the coefficients a through c corresponding to functions $FS_1$ and $FS_2$ have values in the following ranges: $a_1$=0.01-0.25, $b_1$=0.01-0.5, $c_1$=5-60, $a_2$(-0.01)-(-0.25), $b_2$=0.01-0.5, $c_2$=3-30.

In one embodiment, a method is disclosed for preventing overspeed of a turbocharger. The method is implemented as a computer program product comprising a computer readable medium having a computer readable program, wherein the computer readable program when executed on a computer causes the computer to perform the steps for the method. The method includes determining a turbocharger speed error term ($\epsilon_{TS}$), determining a turbocharger speed derivative with respect to time ($\delta_{TS}/\delta_t$), and calculating a turbocharger control response based on the $\epsilon_{TS}$ and the $\delta_{TS}/\delta_t$. The method further includes controlling the turbocharger based on the turbocharger control response. In one embodiment, the $\epsilon_{TS}$ comprises a difference between a nominal turbocharger maximum speed and a current turbocharger speed. The turbocharger control response includes a modified turbocharger maximum speed, and controlling the turbocharger based on the turbocharger control response includes replacing the nominal turbocharger maximum speed with the modified turbocharger maximum speed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
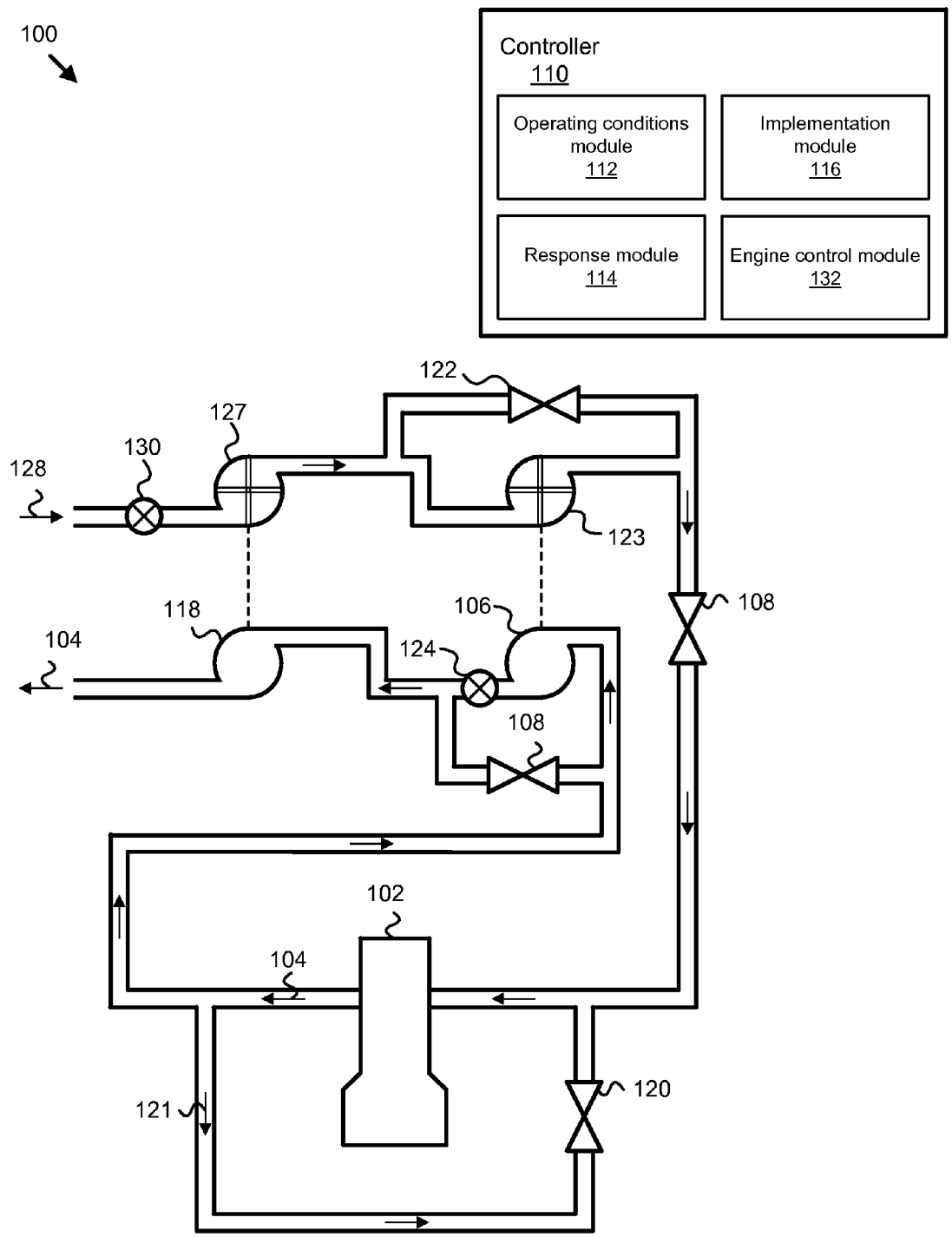
FIG. 1 is a schematic block diagram illustrating one embodiment of a system for preventing overspeed of a turbocharger in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for preventing overspeed of a turbocharger in accordance with the present invention. The system 100 includes an internal combustion engine 102 producing an exhaust stream 104. The system 100 further includes a first turbocharger 106 that receives the exhaust stream 104. The system 100 further includes a bypass valve 108 that routes at least a portion of the exhaust stream 104 around the first turbocharger 106 when the bypass valve 108 is open.

The system 100 further includes a controller 110 having modules configured to functionally execute the steps of preventing overspeed of the turbocharger 106. The controller 110 may be embodied as computer instructions on a computer readable medium, and/or as mechanical components configured to perform the steps indicated herein. In one embodiment, the controller 110 may reside on an electronic control module (ECM) associated with the engine 102, and the controller 110 may control the engine 102 in addition to performing the functions herein. The controller 110 includes an operating conditions module 112, a response module 114, and an implementation module 116. In one embodiment, the controller 110 further includes an engine control module 132.

The operating conditions module 112 determines a turbocharger speed error term ($\epsilon_{TS}$) and a turbocharger speed derivative with respect to time ($\delta_{TS}/\delta_t$). In one embodiment, the $\epsilon_{TS}$ comprises a difference between a nominal turbocharger maximum speed and a current turbocharger speed. The $\epsilon_{TS}$ may include other concepts as understood to one of skill in the art based on the disclosures herein. For example, the $\epsilon_{TS}$ may include a turbocharger speed difference between a current speed and a desired speed, a compressor 123 boost margin, and/or similar parameters of interest that assist a practitioner in determining whether the turbocharger 106 may be near a maximum speed. The turbocharger speed utilized to determine the $\epsilon_{TS}$ may be a measured parameter, an estimated parameter, or a combination of measured and estimated parameters. The turbocharger speed derivative with respect to time ($\delta_{TS}/\delta_t$) may be a measured parameter, an estimated parameter, or a combination of measured and estimated parameters. The turbocharger speed derivative may be filtered or subjected to other signal processing to clean up signal noise as is understood to one of skill in the art.

The response module 114 calculates a turbocharger control response based on the $\epsilon_{TS}$ and the $\delta_{TS}/\delta_t$. The turbocharger control response may be an electronic signal, a physical parameter change, a change in a bit on a computer readable medium, and/or any other type of response understood in the art. The implementation module 116 controls the turbocharger based on the turbocharger control response. The control of the turbocharger may be by any turbocharger control method understood in the art. In one embodiment, the implementation module 116 controls the turbocharger 106 by one or more of the following turbocharger control methods: adjusting the turbine bypass valve 108, adjusting an exhaust gas recirculation valve 120, adjusting a turbocharger wastegate valve (not shown—can be internal to the turbocharger 106), adjusting a compressor bypass valve 122, adjusting an exhaust throttle 124, and adjusting an intake air throttle 130. In one embodiment, the implementation module 116 controls the turbocharger 106 by adjusting the geometry of a variable geometry turbocharger 106.

The controller 110 may be entirely mechanical (e.g. including electrical components and/or pneumatic components), entirely electronic operations on a computer readable medium, or any combination thereof. For example in a mechanical controller 110, the operating conditions module 112 may comprise a physical component responsive to the turbocharger speed derivative with respect to time ($\delta_{TS}/\delta_t$) (e.g. an inductor) and responsive to a turbocharger speed error term ($\epsilon_{TS}$) (e.g. responsive to the how much slower the current turbocharger 106 speed is lower than a pre-determined speed). In the example, the response module 114 may comprise a physical component that generates a signal of a strength based on the output of the physical components responsive to the $\epsilon_{TS}$ and the ($\delta_{TS}/\delta_t$. In the example, the implementation module 116 may be a physical component responsive to the strength of the signal generated by the response module 114. For example, the response module 114 may generate a variable voltage, and the implementation module 116 may move the bypass valve 108 a variable amount based on the variable voltage generated by the response module 114.

In an alternate example in an electronic controller 110 comprising operations on a computer readable medium, the operating conditions module 112 may read a first memory location having the $\epsilon_{TS}$ and a second memory location having the $\delta_{TS}/\delta_t$. The response module 114 may perform calculations on the $\epsilon_{TS}$ and the $\delta_{TS}/\delta_t$ to determine a response value, and report the response value to the implementation module 116. The implementation module 116 may write a value to a third memory location, which may be utilized by some other component in the system 100 to move an actuator or the like and thereby control the turbocharger 106. The examples are provided for illustration only, and all combinations controller 110 elements that are mechanical, electronic, pneumatic, and the like are contemplated within the scope of the present invention.

In one embodiment, the controller 110 includes an engine control module 132 that has an air flow target parameter and a turbocharger speed target parameter. The implementation module 116 may control the turbocharger 106 by adjusting at least one of the air flow target parameter and the turbocharger speed target parameter. The air flow target parameter and/or the turbocharger speed target parameter may be inputs to the controls of the engine 102, and thereby control the turbocharger 106. For example, the implementation module 106 may submit a reduced air flow target parameter to the engine control module 132, causing the engine controls to make a system 100 adjustment that reduces the flow of intake air 128 into the system. It is understood by one of skill in the art that many system 100 components may be utilized to adjust the flow of intake air 128, and that many of these adjustments affect the speed of the turbocharger 106. In the example, the controller 110 may adjust a turbocharger 106 geometry to a less aggressive setting, reducing the intake air flow 128 and the speed of the turbocharger 106.

The system 100 may include a second turbocharger 118. The second turbocharger 118 is in series flow with the first turbocharger 106, with a second compressor 127 compressing intake air 128 before the first compressor 123, and receiving exhaust air 104 at the second turbocharger 118 after the first turbocharger 106. The first turbocharger 106 is a high pressure turbocharger, and the second turbocharger 118 is a low pressure turbocharger. In an embodiment with a second turbocharger 118, the first turbocharger 106 is likely to be a small turbocharger that provides quick response, but is more easily susceptible to overspeed events in high engine 102 transient events. Although the greater challenge to prevent overspeed tends to be with the high pressure turbocharger 106, the use of the present invention to control overspeed events for only the low pressure turbocharger 118, even where a high pressure turbocharger 106 is present, is contemplated within the scope of the present invention. For example, and without limitation, the high pressure turbocharger 106 may be tuned conservatively, where the high pressure turbocharger 106 is bypassed at low exhaust flow 104 rates. In the example, the low pressure turbocharger 118 may also have a bypass and/or wastegate (not shown), and the present invention could be utilized to tune the low pressure turbocharger 118 aggressively and still protect the low pressure turbocharger 118 from overspeed events.

Figure 2:
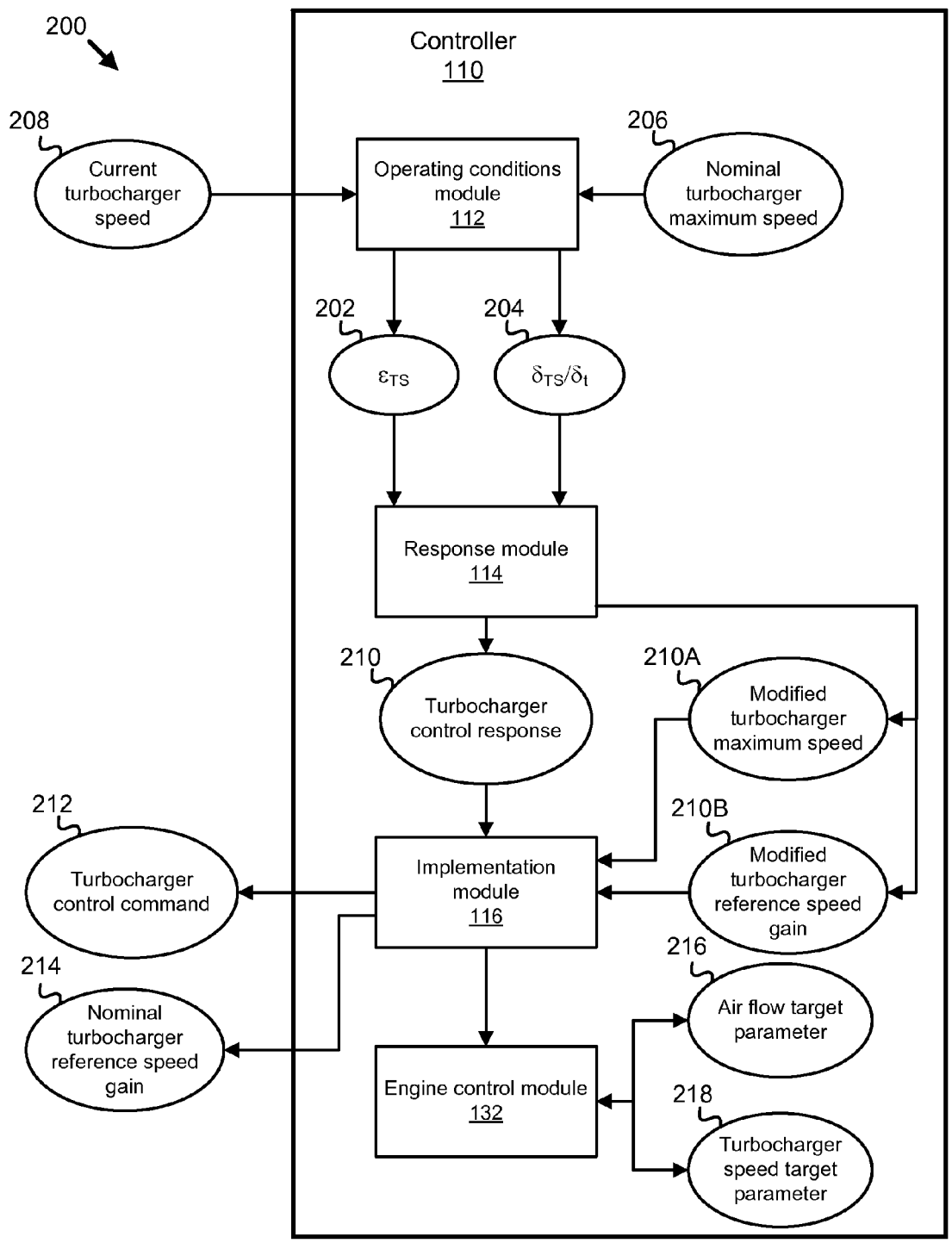
FIG. 2 is a schematic block diagram illustrating one embodiment of a controller for preventing overspeed of a turbocharger in accordance with the present invention.

FIG. 2 is a schematic block diagram illustrating one embodiment of a controller 110 for preventing overspeed of a turbocharger in accordance with the present invention. The controller 110 includes an operating conditions module 112 that determines a turbocharger speed error term ($\epsilon_{TS}$) 202 and a turbocharger speed derivative with respect to time ($\delta_{TS}/\delta_t$) 204. In one embodiment, the operating conditions module 112 determines a difference between a nominal turbocharger maximum speed 206 and a current turbocharger speed 208 as the $\epsilon_{TS}$ 202. For example, if the nominal turbocharger maximum speed 206 is 120,000 RPM, and the current turbocharger speed 208 is 90,000 RPM, the $\epsilon_{TS}$ 202 may be determined to be 30,000 RPM (or −30,000 RPM, depending upon sign convention). The operating conditions module 112 may determine the $\delta_{TS}/\delta_t$ 204 by reading a stored value in the controller 110, tracking the current turbocharger speed 208 over time, or through any other method understood in the art.

The controller 110 further includes a response module 114 that calculates a turbocharger control response 210 based on the $\epsilon_{TS}$ 202 and the $\delta_{TS}/\delta_t$ 204. In one embodiment, the turbocharger control response 210 is a modified turbocharger maximum speed 210A and the response module 114 calculates the modified turbocharger maximum speed 210A by calculating a reference speed multiplier, and multiplying the nominal turbocharger maximum speed 206 by the reference speed multiplier. For example, if the nominal turbocharger maximum speed 206 is 150,000 RPM, and the reference speed multiplier is 0.90, the response module 114 calculates a modified turbocharger maximum speed 210A of 135,000 RPM (0.9*150,000).

Figure 4:
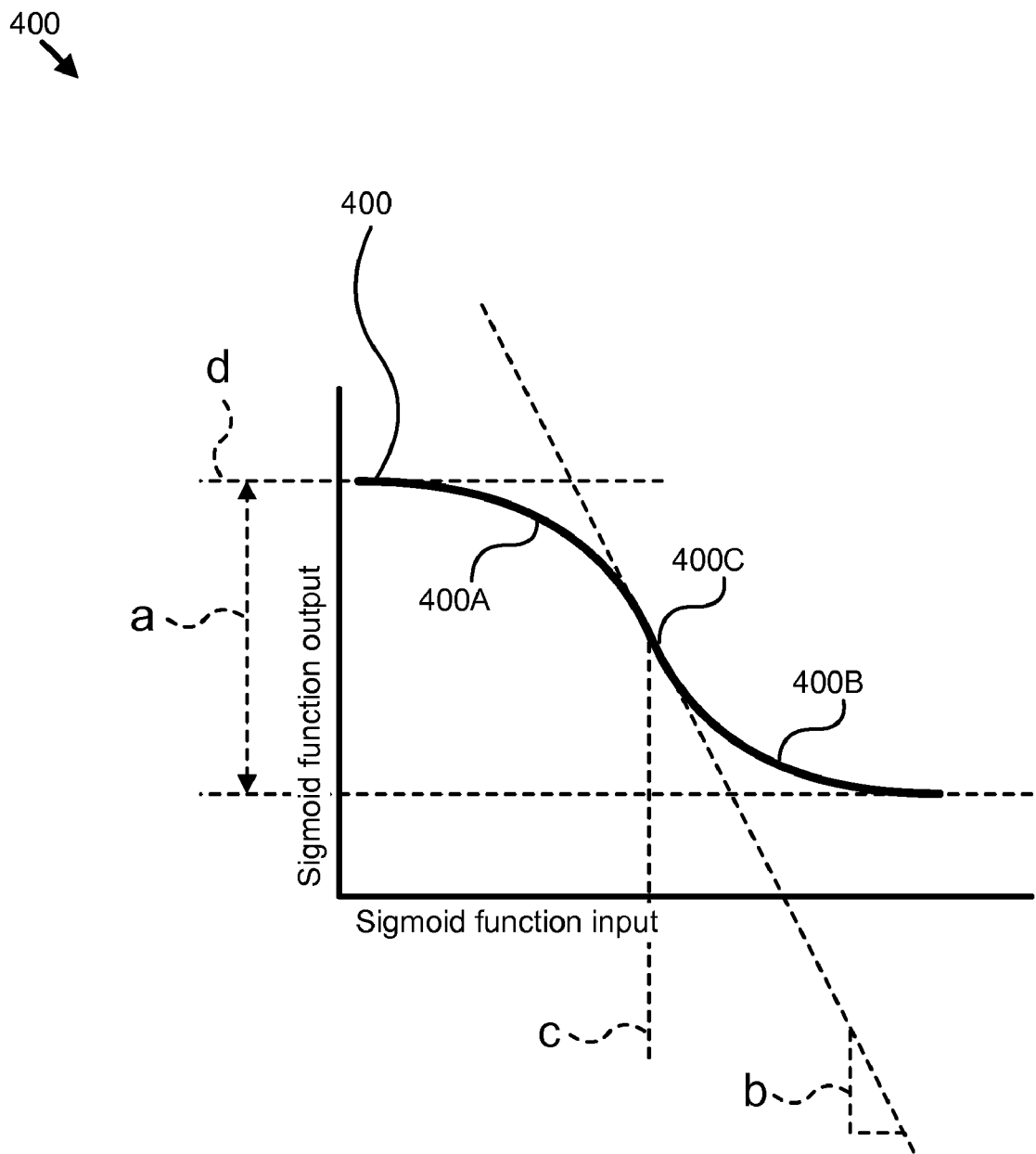
FIG. 4 is a schematic illustration of a sigmoid function in accordance with the present invention.

In one embodiment, the response module 114 calculates the reference speed multiplier by applying a sigmoidal function to each of the $\epsilon_{TS}$ 202 and the $\delta_{TS}/\delta_t$ 204 (refer to FIG. 4 and the related description for an example of a sigmoidal function). The application of a sigmoidal function allows the reference speed multiplier to exhibit a high plateau (i.e. no adjustment is necessary) region where trouble controlling overspeed is not expected, a low plateau region (i.e. strongest adjustment is applied) region where maximum overspeed control is utilized, and to allow a smooth transition between plateaus. Therefore, other functions and methods of transitioning between high adjustment and low adjustment are understood to be within the scope of the present invention. In one embodiment, the response module 114 calculates the reference speed multiplier as the product of the sigmoidal function output applied to the $\epsilon_{TS}$ 202 with the sigmoidal function output applied to the $\delta_{TS}/\delta_t$ 204. The reference speed multiplier may further have a MIN applied with the value 1 (i.e. set the reference speed multiplier to the lowest of 1 or the sigmoidal function outputs) to allow shaping of each sigmoid function over a value of 1 if desired while preventing the modified turbocharger maximum speed 210A from exceeding the nominal turbocharger maximum speed 206. It is possible to set the nominal turbocharger maximum speed 206 at an artificially low level and allow the sigmoidal functions to carry the modified turbocharger maximum speed 210A up to the true desired turbocharger maximum speed, for example by applying a MIN with 1.25 rather than 1; this embodiment is contemplated within the scope of the present invention, but is often more complex than necessary and is not a preferred embodiment.

In one embodiment, the turbocharger control response 210 comprises a turbocharger reference speed gain 210B. Referring back to the embodiment where the turbocharger control response 210 is a modified turbocharger maximum speed 210A; at a moment in time "t" where the current turbocharger speed 208 is 100,000 RPM and the nominal turbocharger maximum speed 206 is 120,000 RPM, the engine 102 may have a target turbocharger speed of 120,000 RPM (the maximum) for the best engine response possible. Thus, in the engine 102 controls (not shown), a turbocharger speed controller believes the turbocharger 106 should be 20,000 RPM faster at time "t", and therefore will produce a response (e.g. in a PID controller) with a relative strength recognizing a 20,000 RPM error. When the turbocharger control response 210 sets a modified turbocharger maximum speed 210A of 110,000 RPM (for example), in the engine 102 controls (not shown), a turbocharger speed controller instead believes the turbocharger 106 should be 10,000 RPM faster at time "t", and therefore will produce a response (e.g. in a PID controller) with a relative strength recognizing a 10,000 RPM error. One of skill in the art will recognize that the response module 114 can generate a gain multiplier to produce a response in a turbocharger speed controller in the engine 102 controls with a relative strength similar to the 10,000 RPM error rather than changing the nominal turbocharger maximum speed 206. In one embodiment, the response module 114 calculates a modified turbocharger reference speed gain 210B from the $\epsilon_{TS}$ 202 and the $\delta_{TS}/\delta_t$ 204.

The controller 110 includes an implementation module 116 that controls the turbocharger 106 based on the turbocharger control response 210. The implementation module 116 may generate a turbocharger control command 212 to control the turbocharger 106. In one embodiment, the implementation module 116 replaces a nominal turbocharger maximum speed 206 with the modified turbocharger maximum speed 210A. In one embodiment, the implementation module 116 replaces a nominal turbocharger reference speed gain 214 with the modified turbocharger reference speed gain 210B to control the turbocharger 106.

In one embodiment, the controller 110 includes an engine control module 132 having an air flow parameter 216 and a turbocharger speed target parameter 218, and the implementation module 116 controls the turbocharger by adjusting the air flow target parameter 216 and/or the turbocharger speed target parameter 218. For example, the modified turbocharger maximum speed 210A may be 110,000 RPM, and the implementation module calculates that an air flow target parameter 216 of 25 lbm-min of air will keep the turbocharger 106 below 110,000 RPM. In the example, the implementation module 116 adjusts the air flow target parameter 216 to 25 lbm-min of air flow. In the example, adjusting may imply applying a parameter as a minimum or maximum, for example, the implementation module 116 may check whether the air flow target parameter 216 is already below 25 lbm-min of air flow before changing the air flow target parameter 216.

The turbocharger control command 212 may control any component in the system 100 that affects the turbocharger 106. The control of the turbocharger 106 may be by any turbocharger control method understood in the art. In one embodiment, the turbocharger control command 112 issues to perform one or more of the following turbocharger control methods: adjust the turbine bypass valve 108, adjust an exhaust gas recirculation valve 120, adjust a turbocharger wastegate valve (not shown—can be internal to the turbocharger 106), adjust a compressor bypass valve 122, adjust an exhaust throttle 124, and adjust an intake air throttle 130. In one embodiment, the turbocharger control command 212 issues to adjust the geometry of a variable geometry turbocharger 106.

Figure 3:
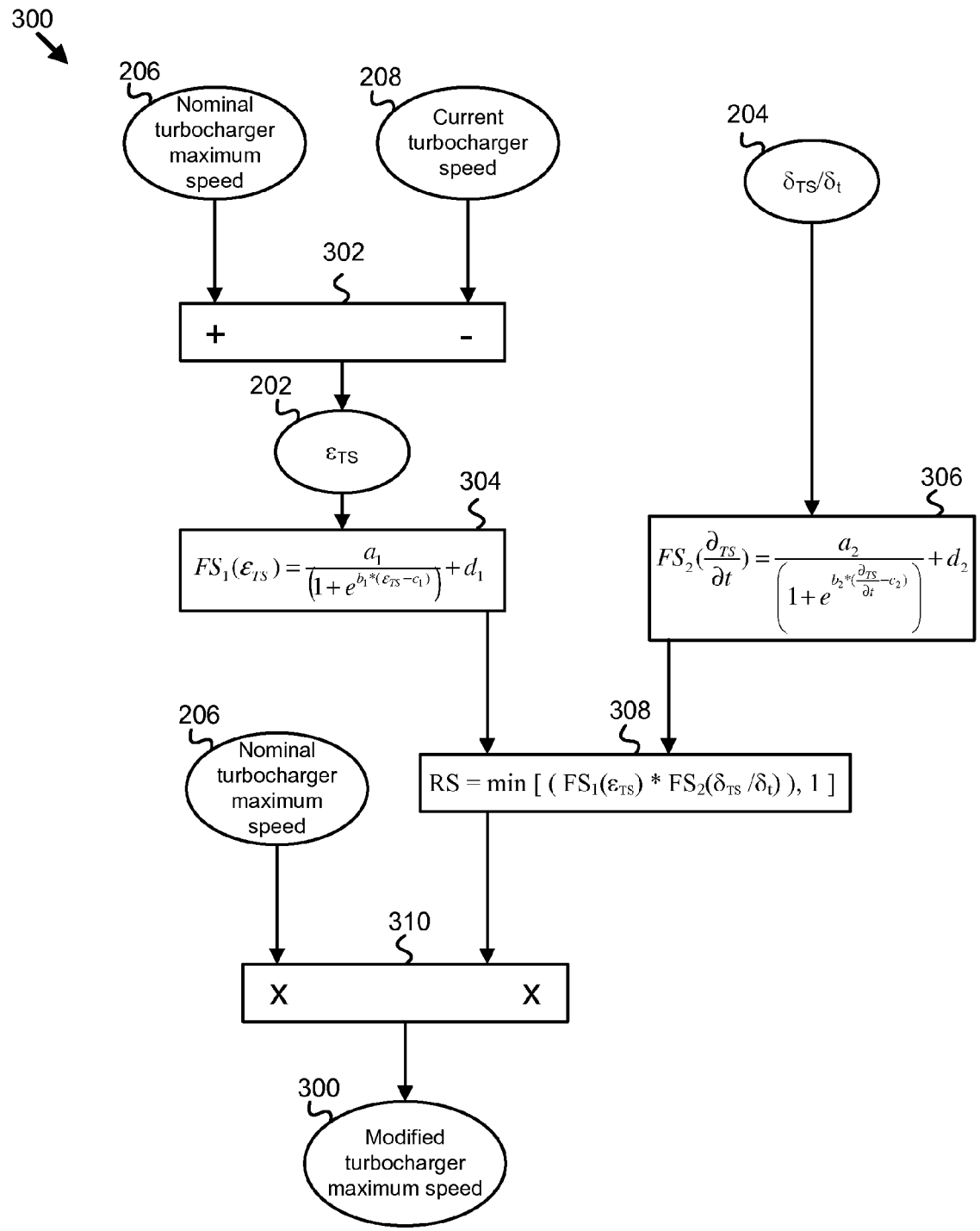
FIG. 3 is a schematic illustration of a one embodiment of a response module determining a turbocharger control response in accordance with the present invention.

FIG. 3 is a schematic illustration of one embodiment a of a response module 114 determining a turbocharger control response 210 in accordance with the present invention. The response module 114 determines an $\epsilon_{TS}$ 202 by calculating a difference 302 between the nominal turbocharger maximum speed 206 and a current turbocharger speed 208. The response module 114 determines a $\delta_{TS}/\delta_t$ 204 by tracking the current turbocharger speed 208 over time, or by reading a stored data value for the $\delta_{TS}/\delta_t$ 204 supplied by the system 100. The response module 114 applies a sigmoidal function to each of the $\epsilon_{TS}$ 202 and the $\delta_{TS}/\delta_t$ 204, a first sigmoidal function 304 to the $\epsilon_{TS}$ 202 and a second sigmoidal function 306 to the $\delta_{TS}/\delta_t$ 204. Each sigmoidal function 304, 206 is of the form:

$$FS_n(y) = \frac{a_n}{(1 + e^{b_n*(y-c_n)})} + d_n. \qquad \text{Equation 1}$$

Where y is one of the $\epsilon_{TS}$ 202 and the $\delta_{TS}/\delta_t$ 204, where n is an integer (n=1 in the first sigmoidal function 304, and n=2 in the second sigmoidal function 306), and $a_n$, $b_n$, $c_n$, and $d_n$ comprise coefficients corresponding to $FS_n$. The response module 114 calculates a reference speed multiplier (RS) according to the following equation 308:

$$RS = \min[(FS_1(\epsilon_{TS})*FS_2(\delta_{TS}/\delta_t)), 1] \qquad \text{Equation 2.}$$

In Equation 2 (308), the "min" term indicates the selection of the lower of the two terms in the equation, in Equation 2 the lower of $(FS_1(\epsilon_{TS})*FS_2(\delta_{TS}/\delta_t))$ and "1". In one embodiment, the constants in Equation 2 (308) may have the values of about $a_1=0.1$, $b_1=0.15$, $c_1=30$, $d_1=1$, $a_2=-0.1$, $b_2=0.25$, $c_2=15$, and $d_2=1$ with units of $\epsilon_{TS}$ 202 in krpm, and with units of $\delta_{TS}/\delta_t$ 204 in krpm/sec (or equivalent coefficients for other units of $\epsilon_{TS}$ 202 and the $\delta_{TS}/\delta_t$ 204), and with the convention that a negative $\epsilon_{TS}$ 202 suggests an overspeed event (or the equivalent a1 value for a convention where a positive $\epsilon_{TS}$ 202 suggests an overspeed event). These values are given as an example only, and can vary depending upon the specific embodiment such as designed nominal maximum turbocharger speed 206 margin, the mass (inertia) of the turbocharger 106, the expected responsiveness of the engine 102, and similar parameters understood to one of skill in the art based on the disclosures herein. In one embodiment, the coefficients of a through c in the sigmoidal functions may have values in the following ranges: $a_1=0.01$-$0.25$, $b_1=0.01$-$0.5$, $c_1=5$-$60$, $a_2=(-0.01)$-$(-0.25)$, $b_2=0.01$-$0.5$, $c_2=3$-$30$. Refer to the section referencing FIG. 4 for further information on an example sigmoidal function and the consequences of the values for coefficients "a" through "d".

The response module 114 multiplies 310 the nominal turbocharger maximum speed 206 by the RS to calculate the modified turbocharger maximum speed 210A. In one embodiment, the turbocharger control response 210 is the turbocharger maximum speed 210A, and the implementation module 116 controls the turbocharger 106 based on the turbocharger maximum speed 210A.

FIG. 4 is a schematic illustration of a sigmoid function 400 in accordance with the present invention. A sigmoid function 400 exhibits two curves of opposite concavity (compare 400A and 400B), and allows a function to traverse smoothly from a high plateau to a low plateau. The function 400 in the present invention may follow the form of Equation 1, but may also follow any other form known in the art, including a polynomial of third order or higher, a set of values on a lookup table, a hyperbolic tangent function, and the like. For a function 400 using a form like the logistic function of Equation 1, the coefficients "a" through "d" affect the function 400 as indicated in FIG. 4. The "d" coefficient is multiplied by the maximum response amplitude, and is therefore illustrated as having a value of "1" throughout the examples herein as a reference speed multiplier (RS) of "1" provides the nominal turbocharger maximum speed 206 as the modified turbocharger maximum speed 210A, although other conventions using a "d" value other than "1" are possible.

The value "a" provides the amount of offset from "d" at a high adjustment state. For example, if the "a" is 0.1, the "d" is 1.0, and the sigmoid function input is the $\delta_{TS}/\delta_t$ 204, then at a high value of $\delta_{TS}/\delta_t$ 204 the function 400 output approaches 0.9. The value "c" provides the sigmoid function input value at which the inflection point 400C occurs, which will also be half the amount of offset provided at "a". Higher values of "c" will make the function 400 respond more slowly to a disturbance in the input, and lower values of "c" will make the function 400 response more quickly to a disturbance in the input. The value "b" provides the slope of the function 400 at the inflection point 400C. Higher values of "b" provide longer plateaus and a sharper transition response, while lower values of "b" provide shorter plateaus and more gradual transition response.

Figure 5:
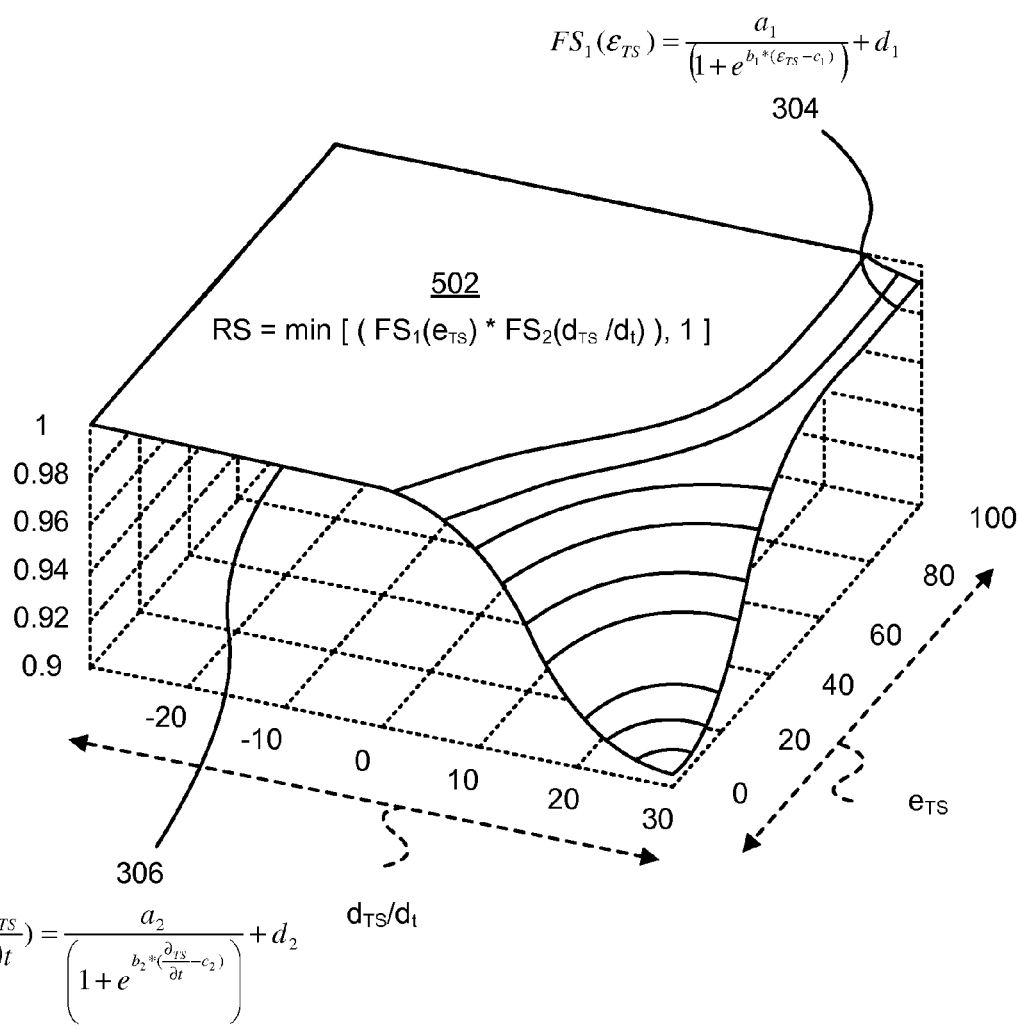
FIG. 5 is a schematic illustration of a reference speed multiplier in accordance with the present invention.

FIG. 5 is a schematic illustration of a reference speed multiplier (RS) 500 in accordance with the present invention. The RS 500 is shown as a three-dimensional surface 502 implementing the sigmoidal functions 304, 306 and the RS 500 calculated according to Equation 2. The surface 502 exhibits a large flat region where little response adjustment occurs, and where the high plateaus of the sigmoidal functions 304, 306 intersect. The effect of multiplying the sigmoidal functions 304, 306 is evident—where the maximum response occurs at a position where the $\epsilon_{TS}$ 202 is lowest (i.e. the turbocharger 106 has little speed margin before reaching the maximum speed) and where the $\delta_{TS}/\delta_t$ 204 is highest (i.e. the turbocharger is accelerating at a high rate 106). FIG. 5 is evident from an embodiment utilizing Equations 1 and 2 above, and is provided for illustration only.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
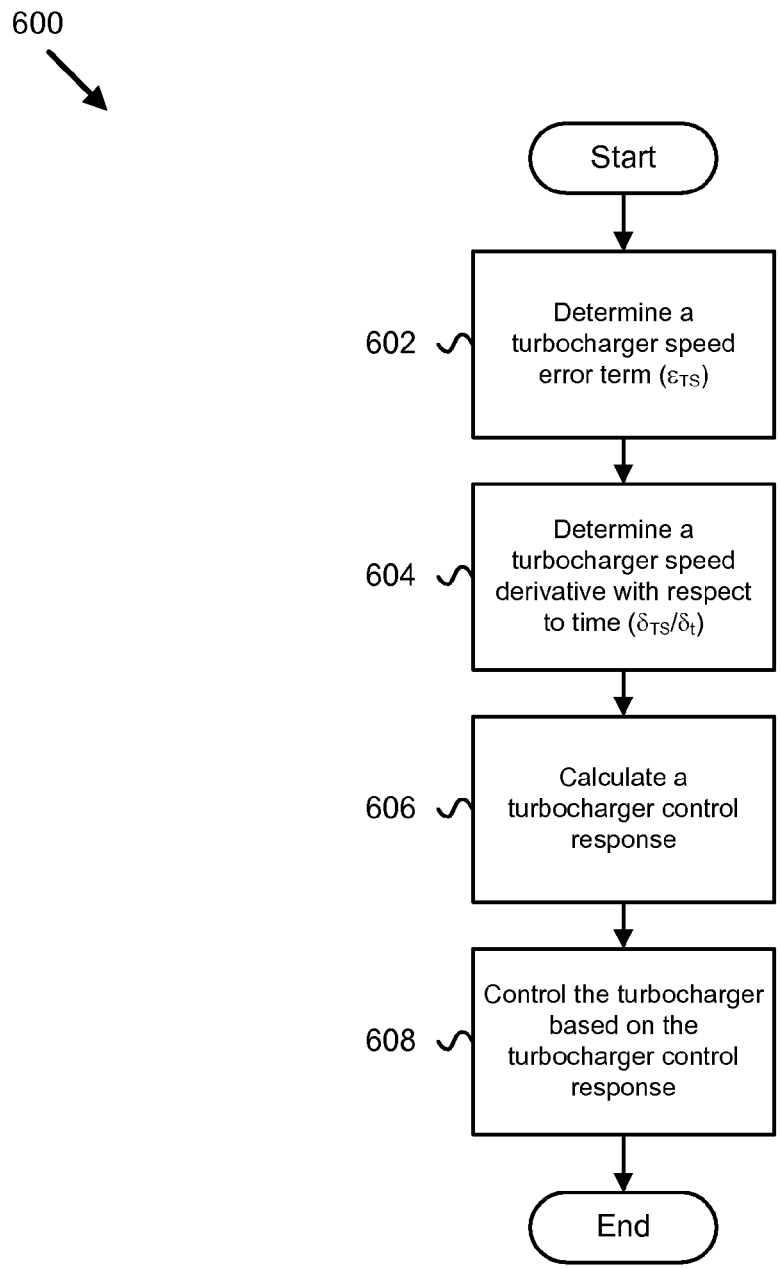
FIG. 6 is a schematic flow chart diagram illustrating one embodiment of a method for preventing overspeed of a turbocharger in accordance with the present invention.

FIG. 6 is a schematic flow chart diagram illustrating one embodiment of a method 600 for preventing overspeed of a turbocharger in accordance with the present invention. The method 600 includes an operating conditions module 112 determining 602 a turbocharger speed error term 202, and determining 604 a turbocharger speed derivative with respect to time 204. The method 600 includes a response module 114 calculating 606 a turbocharger control response 210 based on the turbocharger speed error term 202 and the turbocharger speed derivative with respect to time 204. The method 600 further includes an implementation module 116 controlling 608 the turbocharger based on the turbocharger control response 210.

Figure 7:
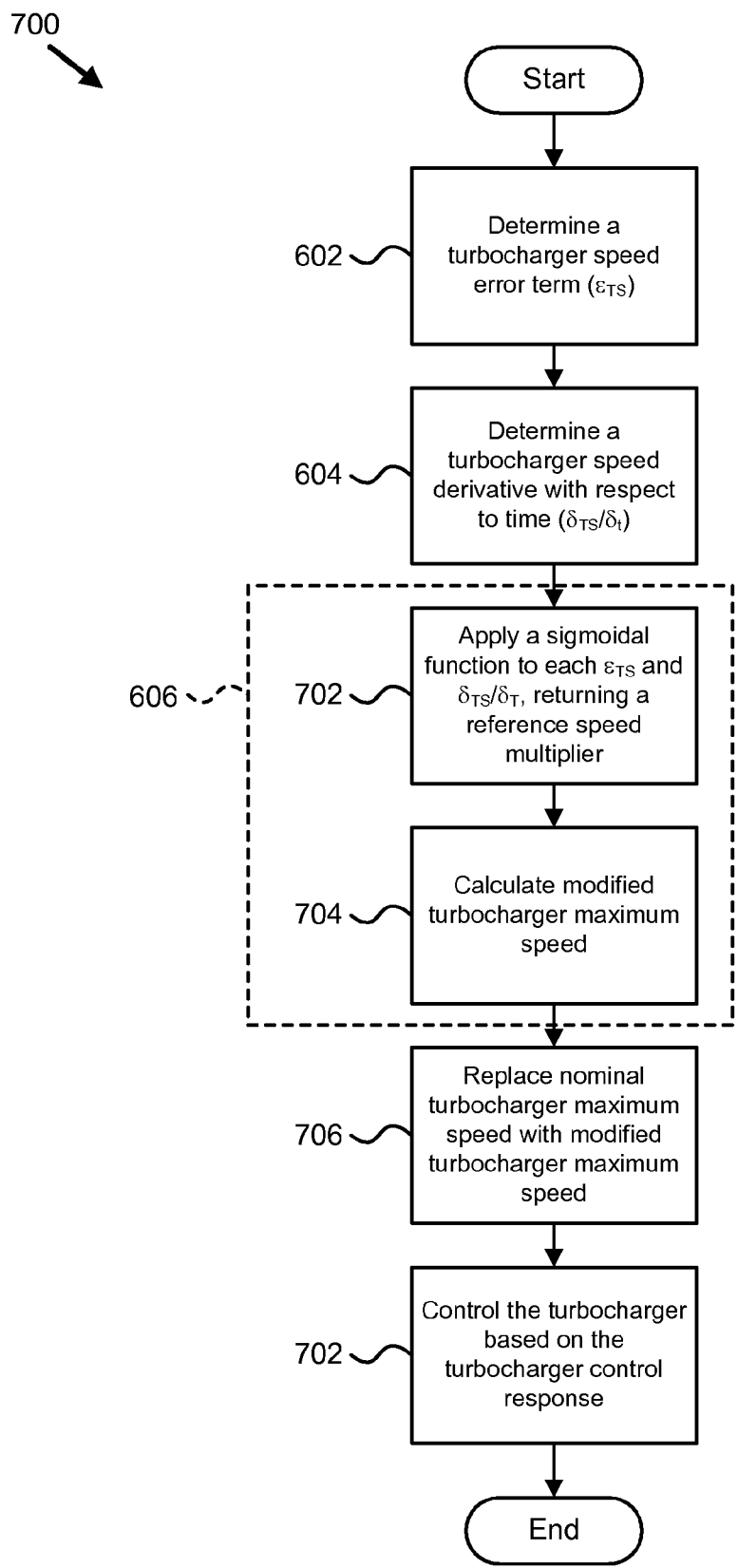
FIG. 7 is a schematic flow chart diagram illustrating an alternate embodiment of a method for preventing overspeed of a turbocharger in accordance with the present invention.

FIG. 7 is a schematic flow chart diagram illustrating an alternate embodiment of a method 700 for preventing overspeed of a turbocharger in accordance with the present invention. The method 700 includes an operating conditions module 112 determining 602 a turbocharger speed error term 202, and determining 604 a turbocharger speed derivative with respect to time 204. The method 700 further includes a response module 114 calculating 606 a turbocharger control response 210 based on the turbocharger speed error term 202 and the turbocharger speed derivative with respect to time 204. Calculating 606 a turbocharger control response includes the response module 114 applying 702 a sigmoidal function to each of the turbocharger speed error term 202, and determining 604 a turbocharger speed derivative with respect to time 204, and returning a reference speed multiplier (RS), for example by applying Equation 2 (308) to the sigmoidal function 304, 306 outputs. Calculating 606 a turbocharger control response further includes calculating 704 a modified turbocharger maximum speed, for example by multiplying 310 the RS by the nominal turbocharger maximum speed 206. The method 700 further includes an implementation module 116 replacing 706 a nominal turbocharger maximum speed 206 with the modified turbocharger maximum speed 210A, and controlling 708 the turbocharger based on the turbocharger control response 210 by controlling 708 the turbocharger to the modified turbocharger maximum speed 210A.

Figure 8:
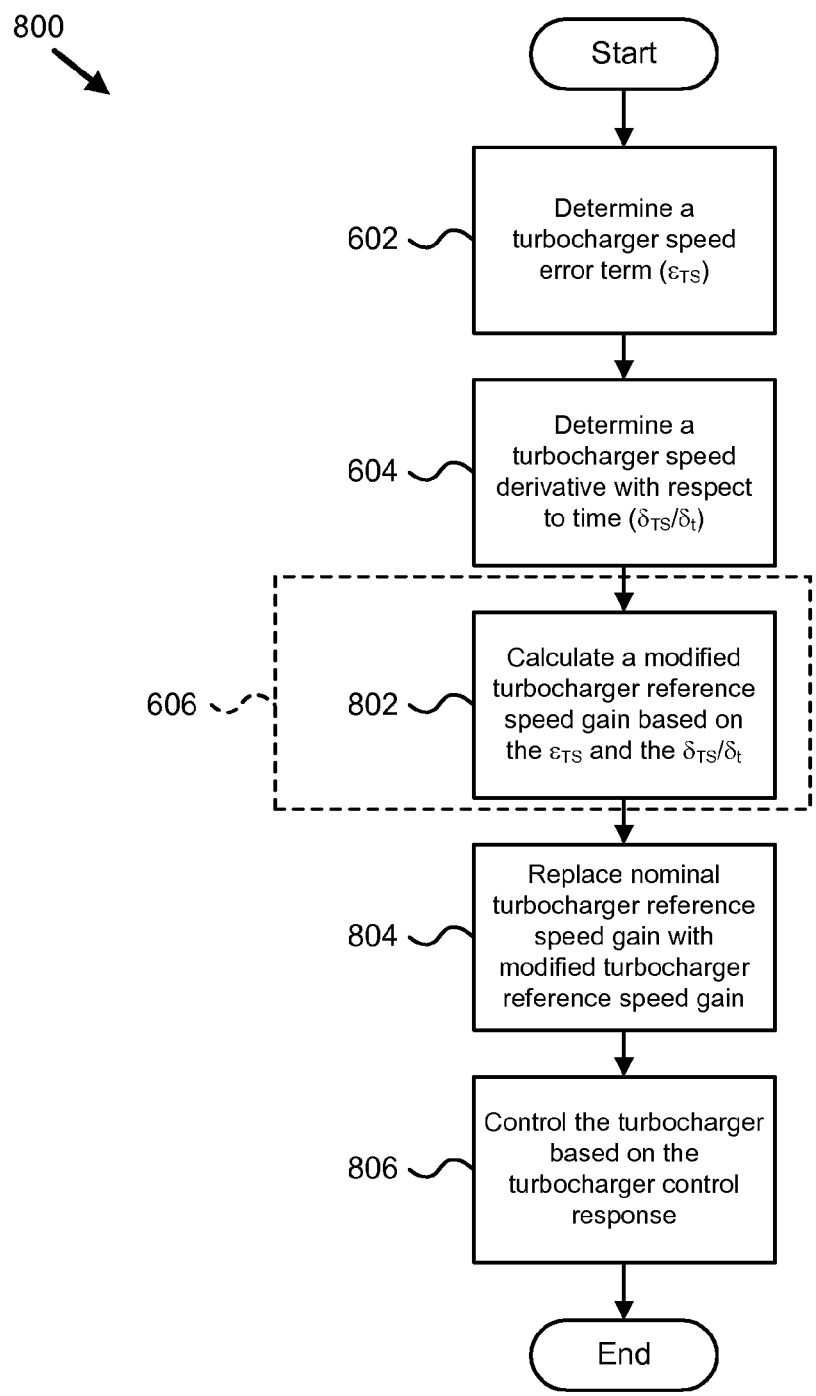
FIG. 8 is a schematic flow chart diagram illustrating an alternate embodiment of a method for preventing overspeed of a turbocharger in accordance with the present invention.

FIG. 8 is a schematic flow chart diagram illustrating an alternate embodiment of a method 800 for preventing overspeed of a turbocharger in accordance with the present invention. The method 800 includes an operating conditions module 112 determining 602 a turbocharger speed error term 202, and determining 604 a turbocharger speed derivative with respect to time 204. The method 700 further includes a response module 114 calculating 606 a turbocharger control response 210 based on the turbocharger speed error term 202 and the turbocharger speed derivative with respect to time 204. Calculating 606 a turbocharger control response 210 includes calculating 802 a modified turbocharger reference speed gain 210B based on the turbocharger speed error term 202 and the turbocharger speed derivative with respect to time 204. The method 800 further includes replacing 804 a nominal turbocharger reference speed gain 214 with the modified turbocharger reference speed gain 210B. The method 800 further includes controlling 806 the turbocharger based on the turbocharger control response by controlling 806 the turbocharger utilizing the modified turbocharger reference speed gain 210B.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having a computer readable program, wherein the computer readable program when executed on a computer causes the computer to:

determine a turbocharger speed error term ($\epsilon_{TS}$), wherein the $\epsilon_{TS}$ comprises a difference between a nominal turbocharger maximum speed and a current turbocharger speed;

determine a turbocharger speed derivative with respect to time ($\delta_{TS}/\delta_t$);

calculate a turbocharger control response based on the $\epsilon_{TS}$ and the $\delta_{TS}/\delta_t$; and control a turbocharger based on the turbocharger control response, wherein the turbocharger control response comprises a modified turbocharger maximum speed, and wherein controlling the turbocharger based on the turbocharger control response comprises replacing the nominal turbocharger maximum speed with the modified turbocharger maximum speed.

2. The computer program product of claim 1, wherein the computer readable program when executed on a computer further causes the computer to:
calculate a reference speed multiplier by applying a sigmoidal function to each of the $\epsilon_{TS}$ and the $\delta_{TS}/\delta_t$; and
calculate the modified turbocharger maximum speed by calculating a reference speed multiplier, and multiplying the nominal turbocharger maximum speed by the reference speed.

3. The computer program product of claim 1, wherein the computer readable program when executed on a computer further causes the computer to apply the sigmoidal function $$FS_1(\varepsilon_{TS}) = \frac{a_1}{(1 + e^{b_1*(\varepsilon_{TS}-c_1)})} + d_1$$

to the $\epsilon_{TS}$ and the sigmoidal function $$FS_2\left(\frac{\partial_{TS}}{\partial t}\right) = \frac{a_2}{\left(1 + e^{b_2*\left(\frac{\partial_{TS}}{\partial t}-c_2\right)}\right)} + d_2$$

to the $\delta_{TS}/\delta_t$, and to calculate the reference speed multiplier (RS) according to the following equation:

$$RS=\min[(FS_1(\epsilon_{TS})*FS_2(\delta_{TS}/\delta_t)), 1].$$

4. A system for preventing an overspeed of a turbocharger, the system comprising:
an internal combustion engine producing an exhaust stream;
a first turbocharger receiving the exhaust stream;
a bypass valve that routes at least a portion of the exhaust stream around the first turbocharger when the bypass valve is open;
a controller comprising:
an operating conditions module configured to determine a turbocharger speed error term ($\epsilon_{TS}$) and a turbocharger speed derivative with respect to time ($\delta_{TS}/\delta_t$) wherein the $\epsilon_{TS}$ comprises a difference between a nominal turbocharger maximum speed and a current turbocharger speed;
a response module configured to calculate a turbocharger control response based on the $\epsilon_{TS}$ and the $\delta_{TS}/\delta_t$; and
an implementation module configured to control the first turbocharger based on the turbocharger control response.

5. The system of claim 4, wherein the first turbocharger comprises a high pressure turbocharger, the system further comprising a second turbocharger, wherein the second turbocharger comprises a low pressure turbocharger.

6. The system of claim 4, wherein the implementation module is further configured to control the first turbocharger by at least one turbocharger control method selected from the group of turbocharger control methods consisting of adjusting the turbine bypass valve, adjusting an exhaust gas recirculation valve, adjusting a turbocharger wastegate valve, adjusting a compressor bypass valve, adjusting an exhaust throttle, and an adjusting an intake air throttle.

7. The system of claim 4, wherein the controller further comprises an engine control module having an air flow target parameter and a turbocharger speed target parameter, wherein the implementation module is further configured control the turbocharger by adjusting at least one of the air flow target parameter and the turbocharger speed target parameter.

8. The system of claim 4, wherein the turbocharger control response comprises a modified turbocharger maximum speed, and wherein the response module is further configured to calculate the modified turbocharger maximum speed by calculating a reference speed multiplier, and multiplying the nominal turbocharger maximum speed by the reference speed multiplier.

9. An apparatus for preventing an overspeed of a turbocharger, the apparatus comprising:
an operating conditions module configured to determine a turbocharger speed error term ($\epsilon_{TS}$) and a turbocharger speed derivative with respect to time ($\delta_{TS}/\delta_t$) wherein the $\epsilon_{TS}$ comprises a difference between a nominal turbocharger maximum speed and a current turbocharger speed;
a response module configured to calculate a turbocharger control response based on the $\epsilon_{TS}$ and the $\delta_{TS}/\delta_t$; and
an implementation module configured to control a turbocharger based on the turbocharger control response.

10. The apparatus of claim 9, wherein the implementation module is further configured to control the turbocharger by at least one turbocharger control method selected from the group of turbocharger control methods consisting of: adjusting a turbine bypass valve, adjusting an exhaust gas recirculation valve, adjusting a turbocharger wastegate valve, adjusting a compressor bypass valve, adjusting an exhaust throttle, adjusting an intake air throttle; and adjusting the geometry of a variable geometry turbocharger.

11. The apparatus of claim 9, further comprising an engine control module having an air flow target parameter and a turbocharger speed target parameter, wherein the implementation module is further configured control the turbocharger by adjusting at least one of the air flow target parameter and the turbocharger speed target parameter.

12. The apparatus of claim 9, wherein the turbocharger control response comprises a modified turbocharger maximum speed, and wherein the response module is further configured to calculate the modified turbocharger maximum speed by calculating a reference speed multiplier, and multiplying the nominal turbocharger maximum speed by the reference speed multiplier.

13. The apparatus of claim 12, wherein the response module is further configured to calculate the reference speed multiplier by applying a sigmoidal function to each of the $\epsilon_{TS}$ and the $\delta_{TS}/\delta_t$.

14. The apparatus of claim 13, wherein the response module is further configured to apply the sigmoidal function $$FS_1(\varepsilon_{TS}) = \frac{a_1}{(1 + e^{b_1*(\varepsilon_{TS}-c_1)})} + d_1$$

to the $\epsilon_{TS}$ and the sigmoidal function $$FS_2\left(\frac{\partial_{TS}}{\partial t}\right) = \frac{a_2}{\left(1 + e^{b_2*\left(\frac{\partial_{TS}}{\partial t}-c_2\right)}\right)} + d_2$$

to the $\delta_{TS}/\delta_t$, and wherein the response module is further configured to calculate the reference speed multiplier (RS) according to the following equation:

$$RS=\min[(FS_1(\epsilon_{TS})*FS_2(\delta_{TS}/\delta_t)), 1].$$

15. The apparatus of claim 14, wherein the coefficients a through c corresponding to the functions $FS_1$ and $FS_2$ have values in the following ranges: $a_1$=0.01-0.25, $b_1$=0.01-0.5, $c_1$=5-60, $a_2$=(−0.01)-(−0.25), $b_2$=0.01-0.5, $c_2$=3-30.

16. A method for preventing an overspeed of a turbocharger, the method comprising:
determining a turbocharger speed error term ($\epsilon_{TS}$);
determining a turbocharger speed derivative with respect to time ($\delta_{TS}/\delta_t$);
calculating a turbocharger control response based on the $\epsilon_{TS}$ and the $\delta_{TS}/\delta_t$; and
controlling a turbocharger based on the turbocharger control response.

17. The method of claim 16, wherein the $\epsilon_{TS}$ comprises a difference between a nominal turbocharger maximum speed and a current turbocharger speed.

18. The method of claim 17, wherein the turbocharger control response comprises a modified turbocharger reference speed gain, and wherein controlling the turbocharger based on the turbocharger control response comprises replacing a nominal turbocharger reference speed gain with the modified turbocharger reference speed gain.

19. The method of claim 17, wherein the turbocharger control response comprises a modified turbocharger maximum speed, and wherein controlling the turbocharger based on the turbocharger control response comprises replacing the nominal turbocharger maximum speed with the modified turbocharger maximum speed.

20. The method of claim 19, wherein calculating the turbocharger control response based on the $\epsilon_{TS}$ and the $\delta_{TS}/\delta_t$ comprises applying at least one sigmoidal function to the $\epsilon_{TS}$ and the $\delta_{TS}/\delta_t$.

21. The method of claim 20, wherein applying the at least one sigmoidal function returns a reference speed multiplier, and wherein the modified turbocharger maximum speed equals the nominal turbocharger maximum speed multiplied by the reference speed multiplier.

22. The method of claim 21, wherein each sigmoidal function (FS) is of the form:

$$FS_n(y) = \frac{a_n}{(1 + e^{b_n*(y-c_n)})} + d_n$$

wherein y comprises one of $\epsilon_{TS}$ and $\delta_{TS}/\delta_t$, wherein n comprises an integer identifying the FS, and wherein $a_n$, $b_n$, $c_n$, and $d_n$ comprise coefficients corresponding to $FS_n$.

23. The method of claim 22, wherein n comprises each value from 1 to 2 inclusive, and wherein the reference speed multiplier (RS) comprises:

$RS=\min[(FS_1(\epsilon_{TS})*FS_2(\delta_{TS}/\delta_t)), 1]$.

24. The method of claim 23, wherein the coefficients a through d corresponding to the functions $FS_1$ and $FS_2$ have about the following values: $a_1$=0.1, $b_1$=0.5, $c_1$=30, $d_1$=1, $a_2$=−0.1, $b_2$=0.25, $c_2$=15, and $d_2$=1.

25. The method of claim 23, wherein the coefficients a through c corresponding to the functions $FS_1$ and $FS_2$ have values in the following ranges: $a_1$=0.01-0.25, $b_1$=0.01-0.5, $c_1$=5-60, $a_2$=(−0.01)-(−0.25), $b_2$=0.01-0.5, $c_2$=3-30.

* * * * *